(12) United States Patent
Capurso et al.

(10) Patent No.: US 7,683,855 B2
(45) Date of Patent: Mar. 23, 2010

(54) ELECTRONIC SIGNAGE

(75) Inventors: Robert G. Capurso, Bergen, NY (US);
Stanley W. Stephenson, III, Spencerport, NY (US); David M. Johnson, West Henrietta, NY (US)

(73) Assignee: Industrial Technology Research Institute, Hsinchu (TW)

( * ) Notice: Subject to any disclaimer, the term of this patent is extended or adjusted under 35 U.S.C. 154(b) by 1029 days.

(21) Appl. No.: 10/851,907

(22) Filed: May 21, 2004

(65) Prior Publication Data

US 2007/0220792 A1 Sep. 27, 2007

(51) Int. Cl.
*G09G 5/00* (2006.01)

(52) U.S. Cl. .................. 345/1.1; 345/2; 345/55; 345/87

(58) Field of Classification Search .......... 345/1.1, 345/2, 55, 87
See application file for complete search history.

(56) References Cited

U.S. PATENT DOCUMENTS

| | | | |
|---|---|---|---|
| 6,269,572 B1 * | 8/2001 | Forsythe et al. ............. 40/657 |
| 6,382,126 B1 * | 5/2002 | Findley ...................... 116/209 |
| 6,588,131 B2 * | 7/2003 | O'Connell, Jr. ............. 40/446 |
| 6,621,407 B1 | 9/2003 | Goodwin, III |
| 6,753,830 B2 * | 6/2004 | Gelbman ...................... 345/55 |
| 2004/0041971 A1 * | 3/2004 | Landreth et al. ............ 349/149 |

FOREIGN PATENT DOCUMENTS

| | | |
|---|---|---|
| EP | 0790549 | 8/1997 |
| EP | 1 102 232 A2 | 5/2001 |
| JP | 2000-292777 | * 10/2000 |
| WO | 97/48089 | 12/1997 |
| WO | 03/083561 A2 | 10/2003 |
| WO | 03/083613 A2 | 10/2003 |
| WO | WO 03/083561 | * 10/2003 |

* cited by examiner

*Primary Examiner*—Richard Hjerpe
*Assistant Examiner*—Leonid Shapiro
(74) *Attorney, Agent, or Firm*—Alston & Bird LLP (57) ABSTRACT

A display, a signage system including the display, and methods of writing the display, are described, wherein the system includes at least one display, at least one writing unit, and at least one holder. Each display includes at least one bi-stable display element and at least one electrical interconnect substrate. The display can be written using the writing unit and displayed in the writing unit or in the holder.

33 Claims, 11 Drawing Sheets

ELECTRONIC SIGNAGE

FIELD OF THE INVENTION

The present invention relates to a rewritable, electronic display, and signage systems including such displays.

BACKGROUND OF THE INVENTION

Electronic signs are becoming popular in retail stores in order to keep pricing and sale information as current as possible. For example, prices can be kept up-to-date without having to reprint new price sheets whenever there is a sale or price change. The customer benefits by having the up-to-date information they need about the product pricing, and the retailer benefits by having programmable information that can be readily changed by various electronic means.

One example of an electronic sign as discussed above is described in International Publication No. WO 03/083561 A2, which discloses an electronically programmable/controllable sign including multilayer displays for retail signage. The displays are fabricated with bistable material such as cholesteric liquid crystal material, which can maintain its state indefinitely in the absence of power. The sign is permanently connected to a programmer/controller and drivers.

Another example of an electronic sign is described in International Publication No. WO 03/083613 A2. It discloses a system including low power electronic signs, a remote location managing system for communicating with the plurality of signs, and means of wireless communication to said signs via a computer network connected to a server computer. The system utilizes the advantage of a bistable display by using a power source only when necessary to change the state of the display.

One problem with the signage systems described in the above publications is the cost involved in fitting a complete retail store with multiple, fully integrated signs, wherein each sign includes electronics, a power source, and encasements or frames. Most retail stores have hundreds of pricing signs throughout the store. Most of these signs need price changes once a week or less. It may not be economical to purchase a system such as those described above when many of the signs do not require frequent updates.

Another problem with the above described systems is that the signs include the electronics and power source, and are a costly substitute for paper signs, which is what they are often replacing. The signs can be difficult to mount on item racks and in holders pre-existing in stores for paper signs due to the added thickness of the electronic signs caused by the electronics and power source. These systems fail to offer a simple, cost effective way to stock a retail store with affordable, rewritable signs, which fit more closely with a retailer's pricing scheme.

There is a need for a bistable retail signage system which has a flexible design, including fully integrated electronic signage and cheaper, non-integrated or removable signage, that can be combined in numerous ways. The more flexible system would allow retail consumers to choose only those components they need to complement their existing signage, and to match their needs for frequent or infrequent signage changes, thereby reducing system costs.

SUMMARY OF THE INVENTION

A signage system is disclosed, wherein the signage system includes at least one display having at least one bi-stable display element, and an electrical interconnect substrate capable of an electrical connection to the display element, wherein the display element and the electrical interconnect substrate also have a physical connection; at least one writing unit; and at least one holder, wherein the display can be physically connected to the writing unit or the holder. Methods of writing the display element are also disclosed.

ADVANTAGES

The rewritable electronic display, and the system including at least one display, a writing unit, and a holder, provide thin, inexpensive signage that can be used to display messages. The system enables the displays to be written, then placed in holders where needed in the store, or placed permanently in a writing unit when the display is frequently changed. Any combination of writing units, holders, and displays can be purchased by retailers, depending on their needs and budget. The system is less expensive than other electronic signage systems, is easy to operate, and uses minimal power.

BRIEF DESCRIPTION OF THE DRAWINGS

The invention as described herein can be understood with reference to the accompanying drawings as described below.

The drawings are exemplary only, and depict various embodiments of the invention. Other embodiments will be apparent to those skilled in the art upon review of the accompanying text.

DETAILED DESCRIPTION OF THE INVENTION

An electronic, rewritable display can be used in a signage system. The display can have one or more display element, for example, two, three, or more display elements. Each display element can be flexible. The display element can be made in any shape, for example round, rectangular, parallelogram, square, or irregular. According to certain embodiments, the display can be flexible. The display can have any three dimensional shape, for example, flat, curved, round, polygonal, square, cubed, or irregular. The display, when flexible, can follow the shape of a surface to which it is attached, for example, turning a corner of a wall. The display can be double-sided, having at least one display element on each side. Where the display is polygonal, each face of the polygon can be at least one display element. Each viewing surface of the display, regardless of display shape, can include one or more display elements. If multiple display elements are used, they can be arranged in a pattern, form a grid covering at least a portion of the surface of the display element, or each display element can abut at least one other display element.

The display element can be a rewritable, electronic display element. According to various embodiments, the display element can maintain a desired written message without power. Such display elements can include a bistable material, for example, electrochemical materials; electrophoretic materials, including those manufactured by Gyricon, LLC of Ann Arbor, Mich., and E-ink Corporation of Cambridge, Mass.; electrochromic materials; magnetic materials; and liquid crystal materials. The liquid crystal materials can be twisted nematic (TN), super-twisted nematic (STN), ferroelectric, magnetic, or chiral nematic liquid crystal materials. Chiral nematic liquid crystals can be polymer dispersed liquid crystals (PDLC). Suitable chiral nematic liquid crystal materials include a cholesteric liquid crystal disclosed in U.S. Pat. No. 5,695,682, and Merck BL112, BL118 or BL126, available from EM Industries of Hawthorne, N.Y.

The display element including a bistable material can be formed by methods known in that art of display making. Wherein the bistable material is liquid crystal material, a support having a first patterned conductive layer can be coated with the bistable material or a pre-formed layer of the bistable material can be placed over the first conductive layer. A second conductive layer can be formed over the bistable material to provide for application of electric fields of various intensity and duration to the bistable material to change its state from a reflective state to a transmissive state, or vice versa. The bistable materials can maintain a given state indefinitely after the electric field is removed.

The second conductive layer can be patterned non-parallel to the patterning of the first conductive layer. The intersection of the first conductive layer and the second conductive layer forms a pixel. The bistable material in the pixel changes state when an electric field is applied between the first and second conductive layers.

The second conductive layer can be electrically conductive character segments formed over the bistable material layer by thick film printing, sputter coating, or other printing or coating means. The conductive character segments can be any known aqueous conductive material, for example, carbon, graphite, or silver. An exemplary material is Electrodag 423SS screen printable electrical conductive material from Acheson Corporation. The conductive character segments can be arranged to form numbers 0-9, a slash, a decimal point, a dollar sign, a cent sign, or any other alpha-numeric character or symbol.

A dielectric layer such as deionized gelatin can be formed over the conductive character segments by standard printing or coating techniques. Via holes can be formed over each conductive character segment by the absence of the dielectric layer over at least a portion of each conductive character segment, or by removing a portion of the dielectric layer over each conductive character segment, for example, by ablation or chemical etching.

Electrically conductive traces can be formed over the dielectric layer by printing or coating techniques. One or more electrically conductive trace can flow through a via hole on formation, making electrical contact with the conductive character segment. The conductive traces can extend from the character segment to an exposed area along a side of the display, where the conductive trace forms a contact pad in the exposed area. The exposed area is an area of the substrate coated with the first conductive layer.

The contact pads can be any conductive material, for example, silver or carbon. The contact pads can be formed with the conductive traces, or separately therefrom. Contact pads that are not formed with the conductive traces can be coated or printed on the dielectric layer. A via hole can extend from the conductive pad through the dielectric layer to the first conductive layer. The exposed area and the contact pads thereon can be formed along one side of the display, along multiple sides of the display, or in one or more locations on the display not including the conductive character segment. According to various embodiments, the contact pads can be formed in the exposed area along one edge of the display. The contact pads can be placed linearly or grouped, such as in a pattern, for example, a square or rectangle, in the exposed area.

The optical state of the bistable material between the conductive character segment and the first conductive layer can be changed by selectively applying drive voltages to the corresponding contact pad that is electrically connected to the conductive character segment through a conductive trace, and to the first conductive layer by direct or indirect contact. Once the optical state of the bistable material has been changed, it can remain in that state indefinitely without further power being applied to the conductive layers. Methods of forming the display element are known to practitioners in the art, and are described, for example, in U.S. Ser. No. 10/134,185, filed Apr. 29, 2002 by Stephenson et al., and in co-filed U.S. Ser. No. 10/851,440 to Burberry et al.

One or more display element can be attached to an electrical interconnect substrate. The electrical interconnect substrate can include alignment features for aligning the display element on the electrical interconnect substrate, one or more contact pads for making an electrical connection to a display element, and one or more contact pads for making electrical connection to the display drive source. One or more electrical interconnect substrate can be attached to each display element. One or more display element can be connected to each electrical interconnect substrate.

The electrical interconnect substrate can have one or more display element attached to one surface, or to both surfaces of the electrical interconnect substrate. The attachment can be physical, wherein the display element and electrical interconnect substrate are held together by compression, friction, adhesive bonding, or by other mechanical means, such as tabs, clips, or pins. The electrical interconnect substrate can be electrically connected to one or more physically attached display element. The electrical interconnect substrate can be electrically connected to one or more display elements directly or by secondary connections, such as wires.

A display drive source can be a circuit board for writing or rewriting the display. According to certain embodiments, the circuit board can include a power source, such as a battery. According to other embodiments, the circuit board is capable of connection to an external power source, for example, a battery or an electrical circuit. The display drive source can be connected to the electrical interconnect substrate physically. The display drive source can be electrically connected to the electrical interconnect substrate directly or through some secondary connections, such as wires.

A display including at least one display element and at least one electrical interconnect substrate can be made. For use in a signage system, the display can be written by a writing unit. If the display does not require frequent rewriting, it can be written by the writing unit and moved to a holder. The holder can be a conventional signage holder. The holder can hold one or more display. If the display requires frequent rewriting, it can be left in the writing unit, which itself can act as a holder for the display. According to certain embodiments, the display holder can enable electrical connection of the display to a writing unit without removing the display from the display holder. For example, the display holder can have an opening through which a writing unit can engage the electrical interconnect substrate.

The frame can provide a mechanical connection between the one or more display elements and the one or more electrical interconnect substrates in the display, or between multiple display elements. For example, the frame can hold one or more display elements and one or more electrical interconnect substrate together physically, for example, by friction, compression force, or the use of tabs, pins, or clips extending from the frame to or through each display element and electrical interconnect substrate. The frame can include a compression mechanism, for example, a spring, to provide tension to keep the electrical interconnect substrate and display element in physical connection. The frame can function as a holder.

A signage system can include one or more displays, at least one writing unit, and optionally one or more holder. Each display in the system can be written by placing the display in electrical contact with the writer unit, and supplying data and power to the writer unit to write the display. The data can be provided by a computer in wired or wireless communication with the writing unit.

The display and signage system can be understood with reference to certain embodiments including a cholesteric liquid crystal display element, as depicted in the Figures and described below.

Figure 1:
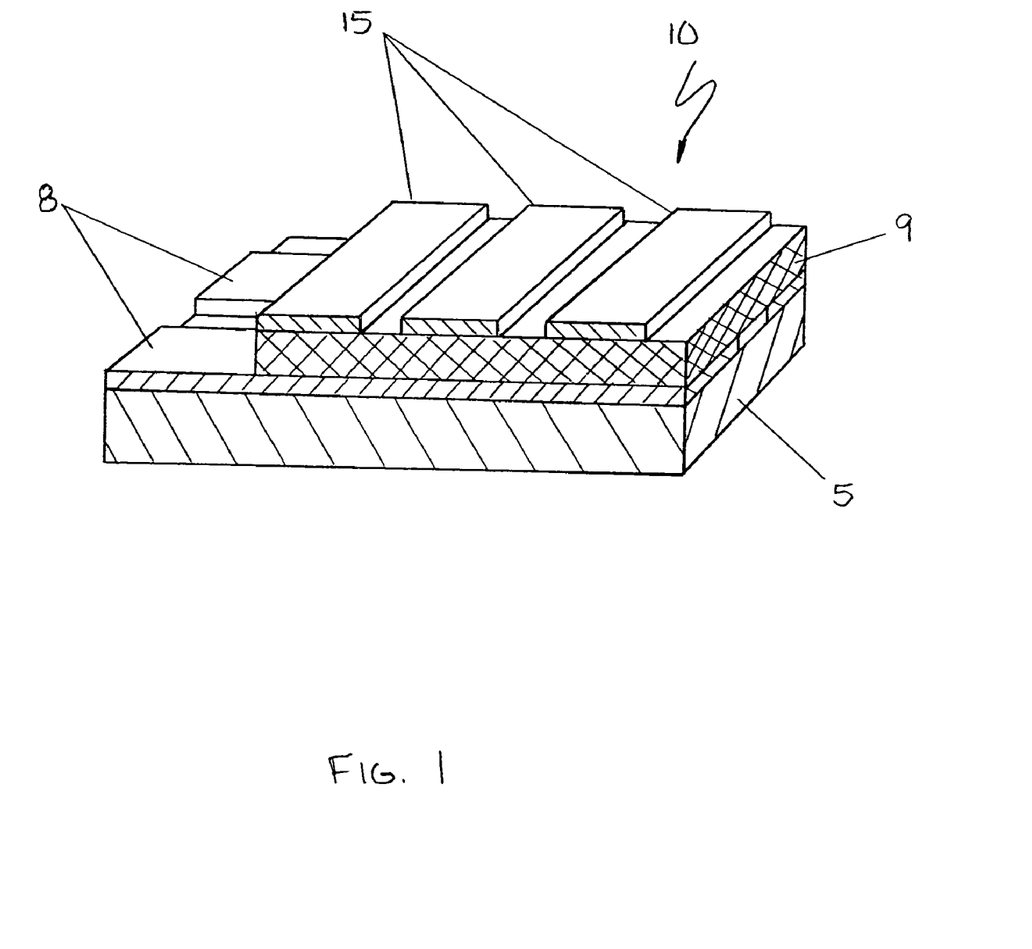
FIG. 1 is a cross sectional view of a display element.

FIG. 1 is a cross-sectional view of a display element 10. The display element 10 has a substrate 5, a first patterned conductive layer 8, and a bistable liquid crystal layer 9. Printed over the liquid crystal layer is a second conductive layer in the form of display electrodes 15. The display electrodes 15 can be formed in any known manner, for example, by thick film printing or sputter coating. By separating the first conductive layer 8 into multiple, separate conductive traces, forming segments, and printing separate display electrodes 15 across first conductive layer segments 8, a pixilated matrix is formed which can be used to electrically address any segment of the display element. The display electrodes 15 are not parallel to the first conductive layer segments 8. According to certain embodiments, the display electrodes 15 can be orthogonal to the first conductive layer segments 8.

Figure 2:
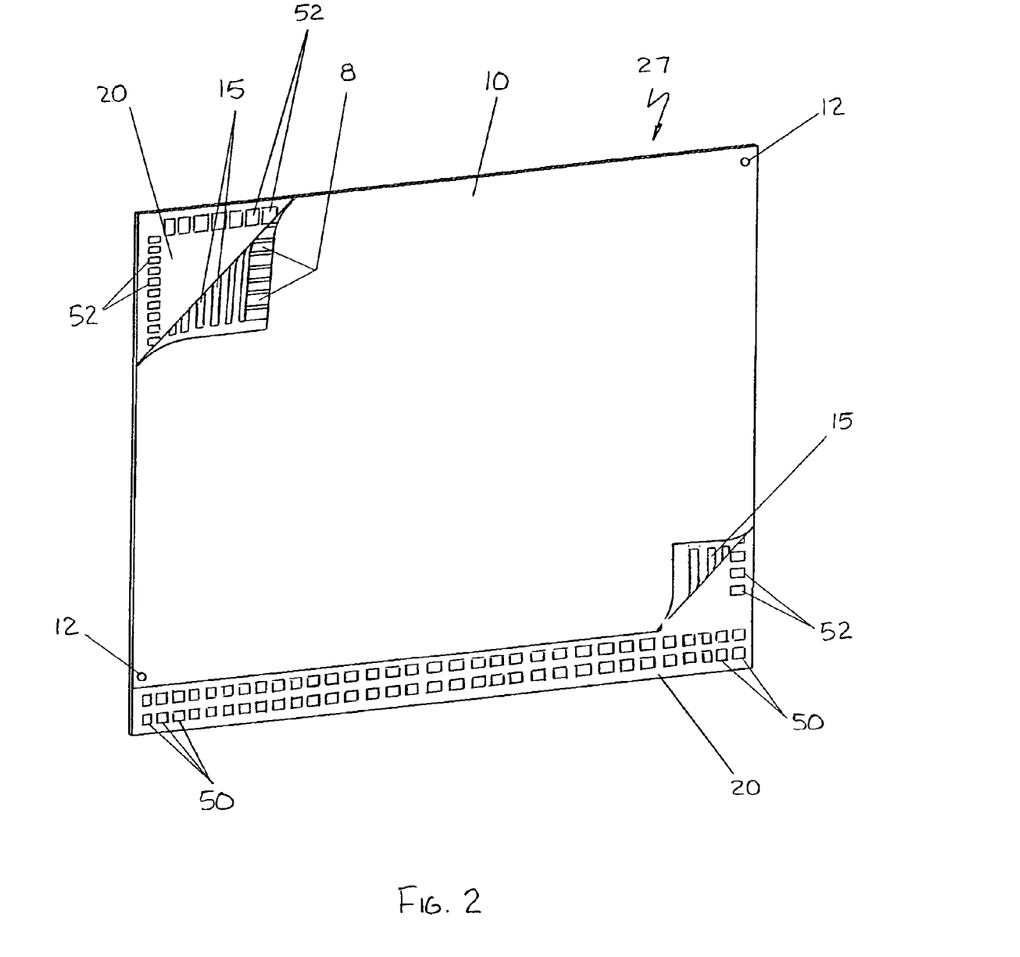
FIG. 2 is a front view of a electrical interconnect substrate and display element.

FIG. 2 shows a display element 10 aligned with a circuit board 20 to form a display 27. The display element 10 can be aligned with the electrical interconnect substrate 20 by way of alignment pins 12. Electrical interconnect substrate 20 can include display contact pads 52. At least a portion of display contact pads 52 can be aligned with the display electrodes 15. Other contact pads 52 can be aligned with the first conductive layer segments 8. The electrical interconnect substrate 20 can include electrical interconnect substrate contact pads 50. Although alignment pins 12 are shown connecting the display element 10 and electrical interconnect substrate 20, other connection means are possible, including friction, adhesive, tabs, clips, or a combination thereof. The orientation of display element 10 with regard to electrical interconnect substrate 20 can be parallel, orthogonal, or any angle in between. The display element 10 can be electrically connected by wires to electrical interconnect substrate 20 without any direct physical connection therebetween.

Figure 3:
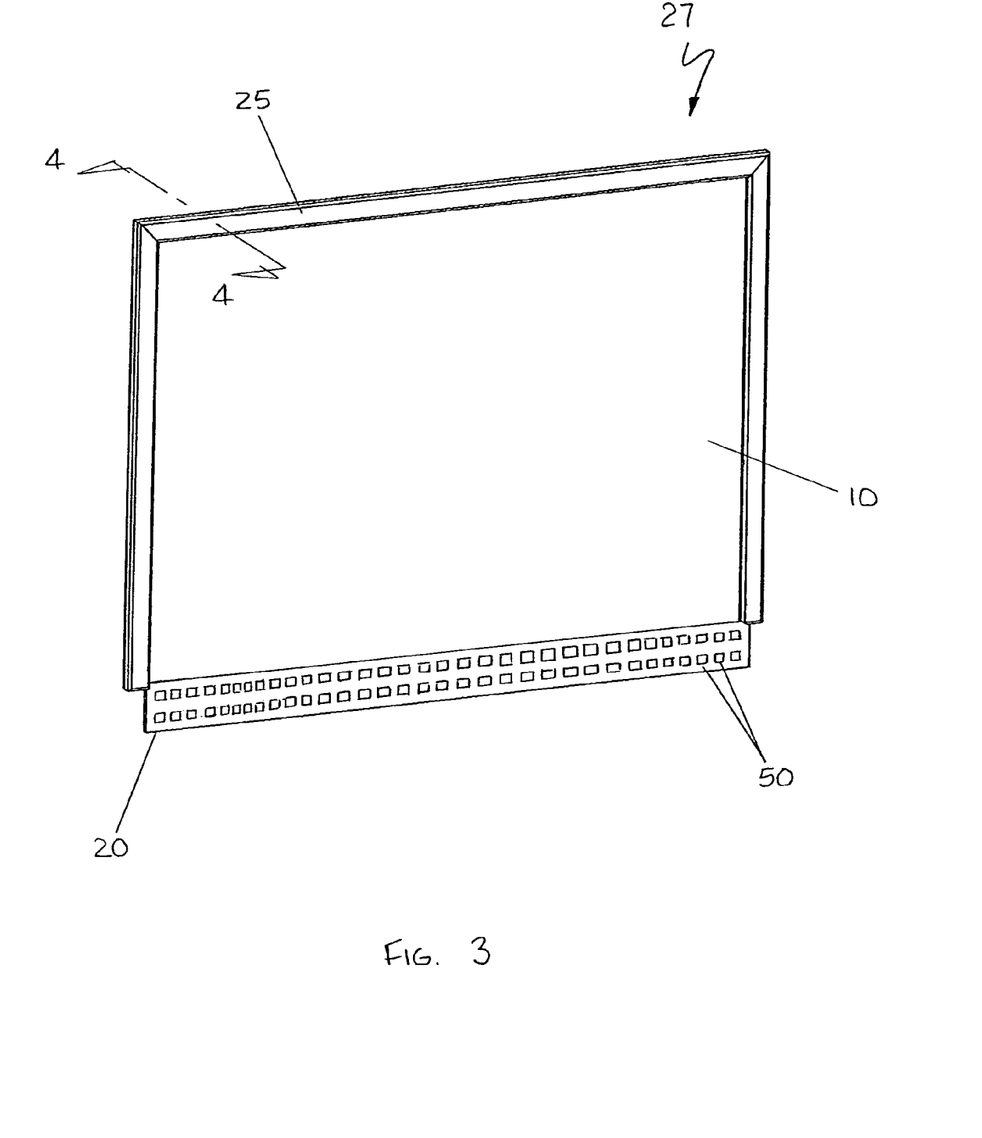
FIG. 3 is a front view of an assembled display.

FIG. 3 shows a display 27 including electrical interconnect substrate 20 and one or more display elements 10 aligned and assembled by way of a frame 25. The frame 25 can provide rigidity and edge protection, and can maintain mechanical contact of the display electrodes 15 and first conductive layer segments 8 to the electrical interconnect substrate display contacts 52 by compression, friction, or other mechanical means. The frame 25 can ensure mechanical and electrical connection between the electrical interconnect substrate 20 and the display element 10 so that electrical signals can be transmitted to the display element to locally change the state of the liquid crystal layer 9. The frame can include a power source or a connection to a power source. The frame can be a holder or can be removably connected to a holder for display.

Figure 4A:
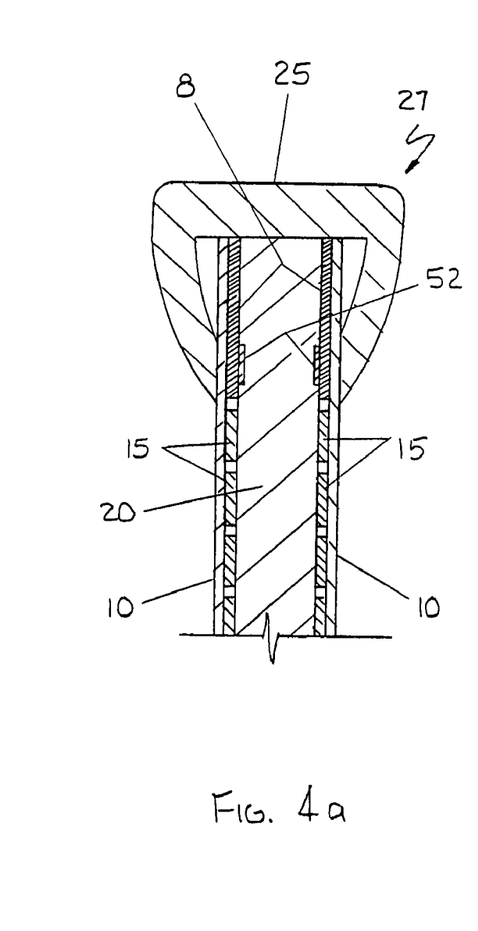
FIG. 4a is a section view of the assembled display of FIG. 3, showing a possible frame configuration.
Figure 4B:
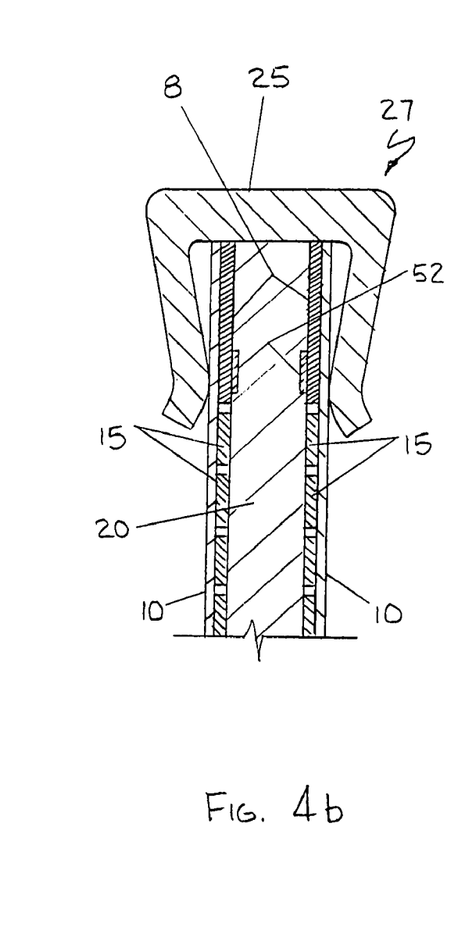
FIG. 4b is a section view of the assembled display of FIG. 3, showing a possible frame configuration.
Figure 4C:
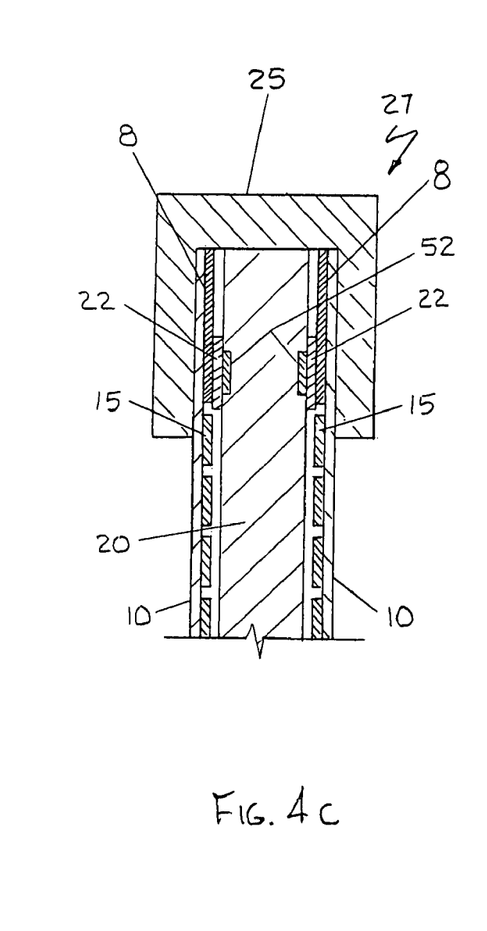
FIG. 4c is a section view of the assembled display of FIG. 3, showing a possible frame configuration.

FIGS. 4a-4d are section views along line 4-4 of FIG. 3 of the frame 25 holding display 27. Each of FIGS. 4a-4d depicts a different possible frame configuration. Each configuration provides rigidity and edge protection for the display, and mechanical compression that provides electrical contact between first conductive layer segments 8 and display electrodes 15, and electrical interconnect substrate contact pads 52. FIG. 4c shows an optional layer of conductive adhesive 22, for example, an anisotropic adhesive, which can be between the display element 10 and electrical interconnect substrate 20 to ensure complete electrical conduction which can be between first conductive layer segments 8 and display electrodes 15, and electrical interconnect substrate display contact pads 52.

Figure 4D:
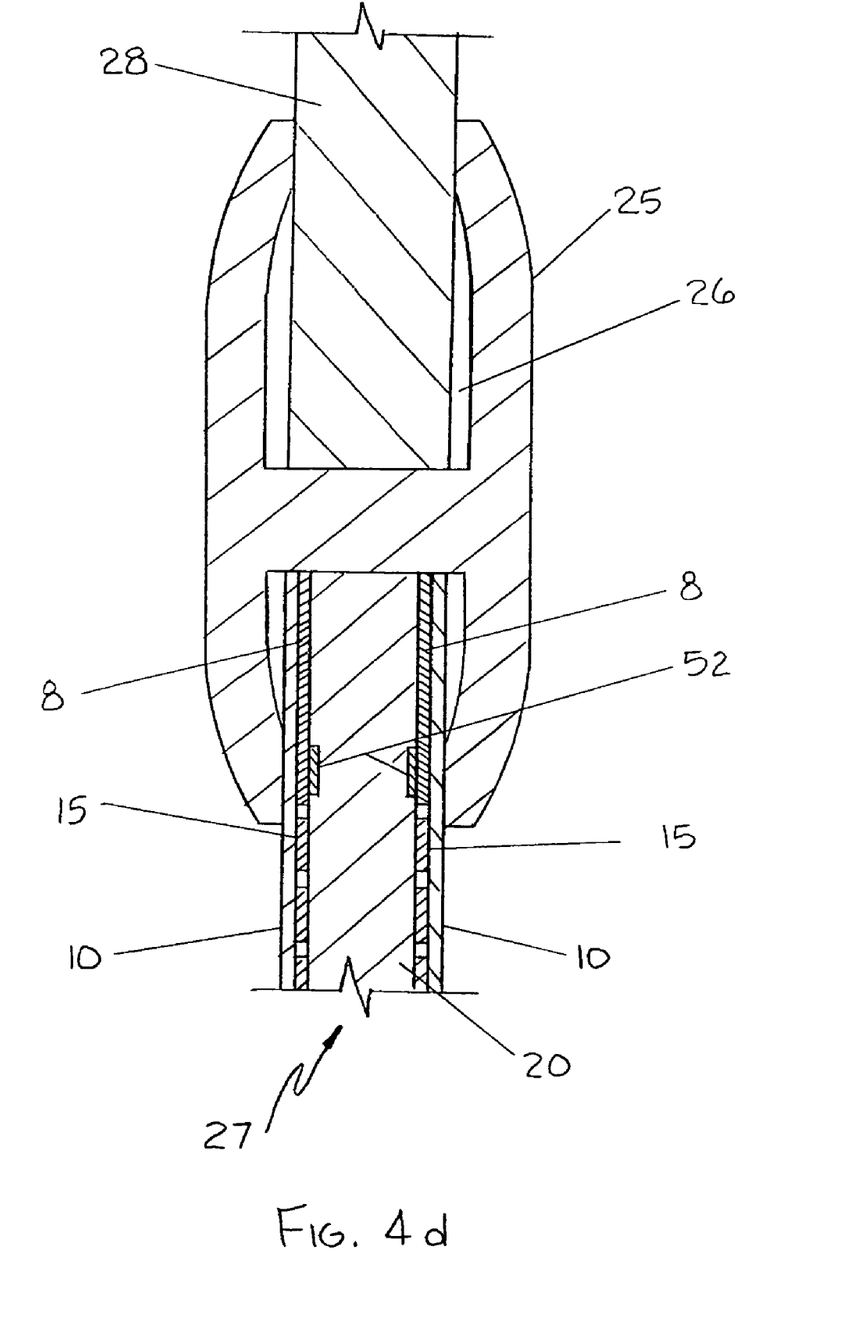
FIG. 4d is a section view of the assembled display of FIG. 3, wherein a frame has provisions for attaching additional signage.

FIG. 4d shows another version of frame 25, wherein the frame includes attachments for additional signage 28. Such attachments for additional signage can include a slot 26, a pin system, a clip system, or any other removable or permanent attachment system. The additional signage can be traditional signage, including paper, plastic, or cardboard; electronic signage, for example, liquid crystal display, light emitting diodes, organic light emitting diodes, bistable display, or rewritable display; or a combination thereof. If signage is electronic, it can be inclusive of a power supply or display drive source, or connected to a power supply and/or display drive source. Retailers can use the additional signage 28 to portray sales or other information. The additional signage 28 can be added to one or more of the top, side, or bottom of frame 25. Any frame profile can be used with the display so long as the frame provides the desired qualities, which can include edge protection, rigidity, and connection, both mechanical and electrical, between the display element and the electrical interconnect substrate, or between multiple display elements.

Figure 5:
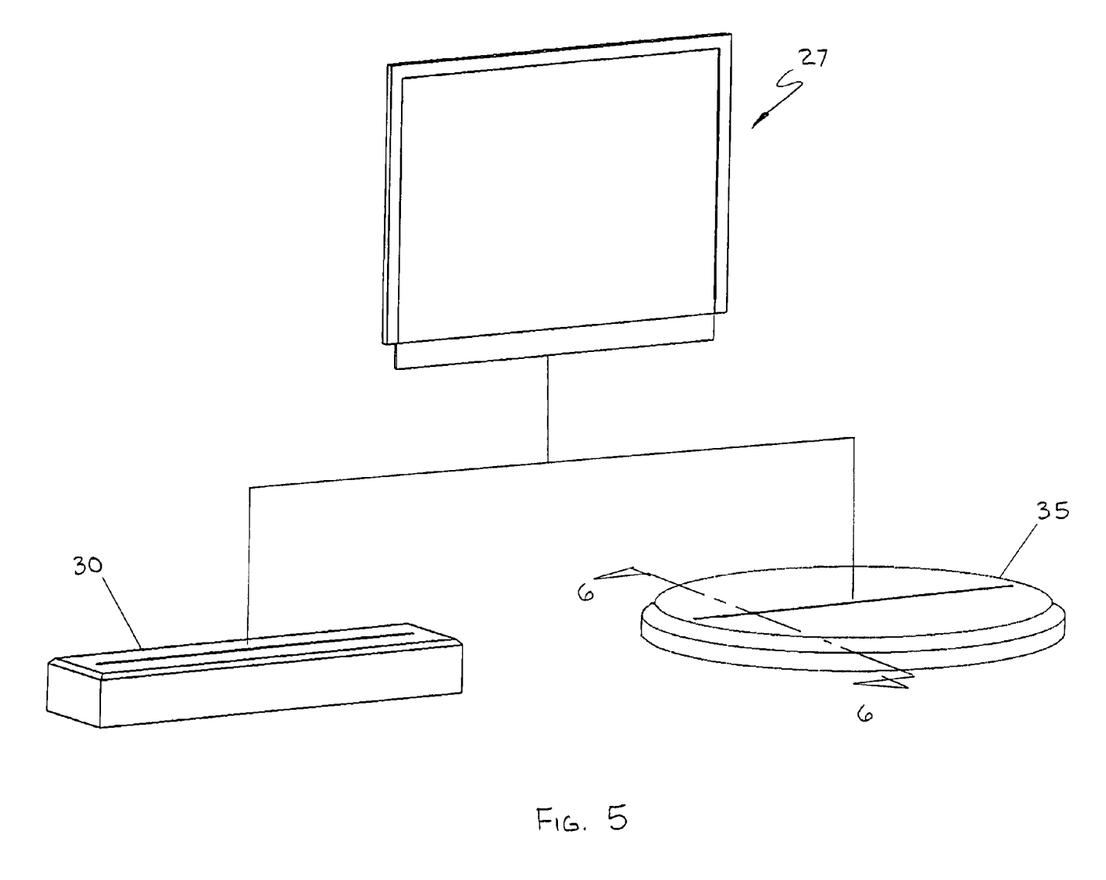
FIG. 5 is a front view showing the display and optional bases.

FIG. 5 shows an exploded view of a signage system including a display 27 in optional frame 25, a holder 30, and a writing unit 35. The holder 30 can be designed to hold the display 27 in a position suitable for viewing. The holder 30 can provide a stable means of holding the display 27 for mounting on a surface, for example, a shelf, rack, stand, wall, or ceiling. The writing unit 35 is a holder that not only provides a stable means of holding the display 27, but can include a display drive source 32. The display 27 mounted into the writing unit 35 can be electrically written and then either removed from writing unit 35, or left in writing unit 35 for display. Writing unit 35 can function as a writing unit or a holder. The writing unit 35 can include a power source, or can be connected to an external power source. The writing unit 35 and holder 30 can be any configuration capable of holding display 27 in a stable, viewable position. For example, they each independently can be a parallelogram, rectangle, square, rounded, triangular, or other regular or irregular shapes. The holder 30 or writing unit 55 can include a stand, can be connected to a stand, or can receive a stand. The stand can include a power source or be connected to a power source. The writing unit 35 can connect to the display 27 through a holder 30.

Figure 6:
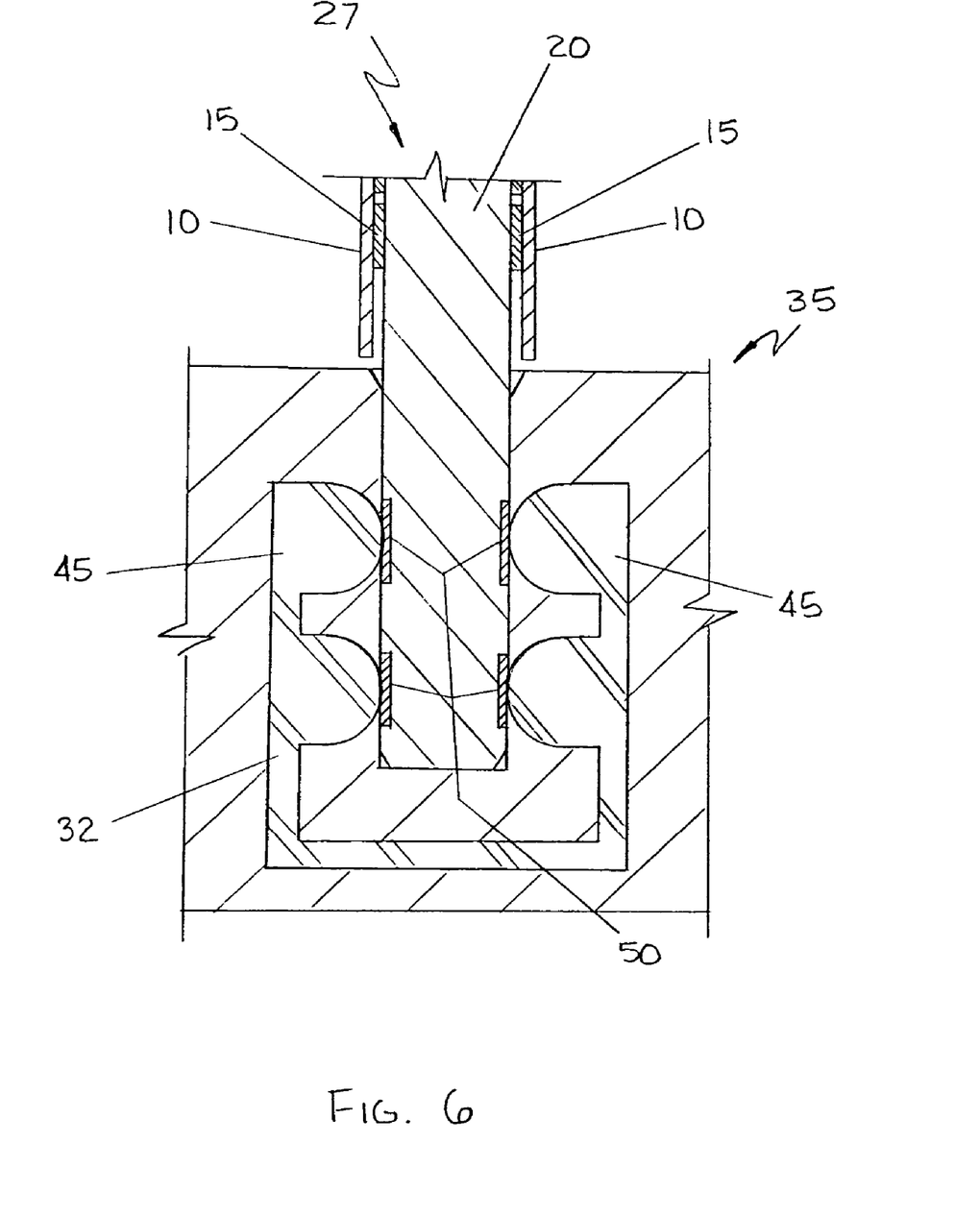
FIG. 6 is a section view of an interconnect area of the display of FIG. 5 along lines 6-6 with a display, where the base of FIG. 5 has a display drive source.

FIG. 6 is a section view along line 6-6 of FIG. 5, showing the display 27 inserted into writing unit 35 including a display drive source 32. The display drive source 32 in writing unit 35 has electrical contacts 45 which contact the electrical interconnect substrate electrical contact pads 50 of the electrical interconnect substrate 20 upon insertion of the display 27 into the writing unit 35, enabling writing of the display elements 10 in display 27 through electrical interconnect substrate 20.

Figure 7A:
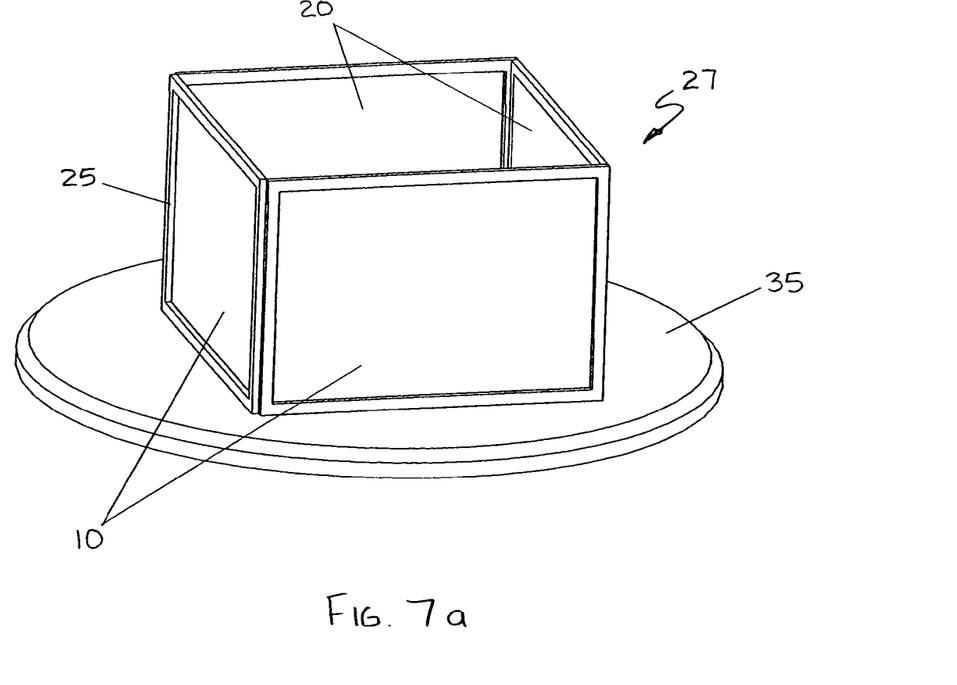
FIG. 7a is an illustration of a three-dimensional display system having a square configuration.
Figure 7B:
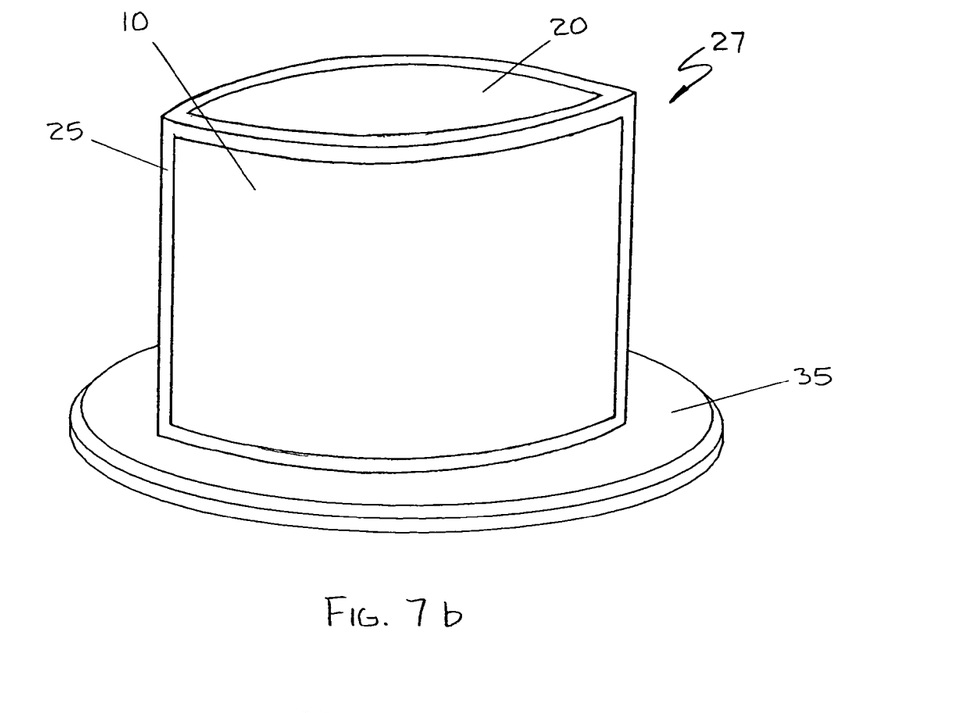
FIG. 7b is an illustration of a three-dimensional display system having a curved configuration.

FIG. 7a is a figure of a three-dimensional display system in the configuration of a parallelogram. Display 27 as shown includes four display elements 10 connected by a frame 25 and mounted on a holder 30. The holder 30 can be a writing unit 35. FIG. 7b is a figure of a curved three-dimensional display system including two display elements 10 that have a curved shape, and a holder 30 that can be a writing unit 35. Although the frame 25 in FIGS. 7a and 7b is shown with an opening, the frame can enclose, or cover, the area between display elements 10.

In both FIGS. 7a and 7b, the display 27 can include an electrical interconnect substrate 20 between the display element 10 and the holder 30, or multiple electrical interconnect substrates 20, each one attached to a display element 10. The electrical interconnect substrate 20 is electrically connected to one or more display element 10 and optionally the holder when the holder is a writing unit, and can be physically connected to one or more display element, the holder, or both.

Where the display includes two or more display elements, each display element can be written separately, or two or more display elements can be written simultaneously.

Figure 8:
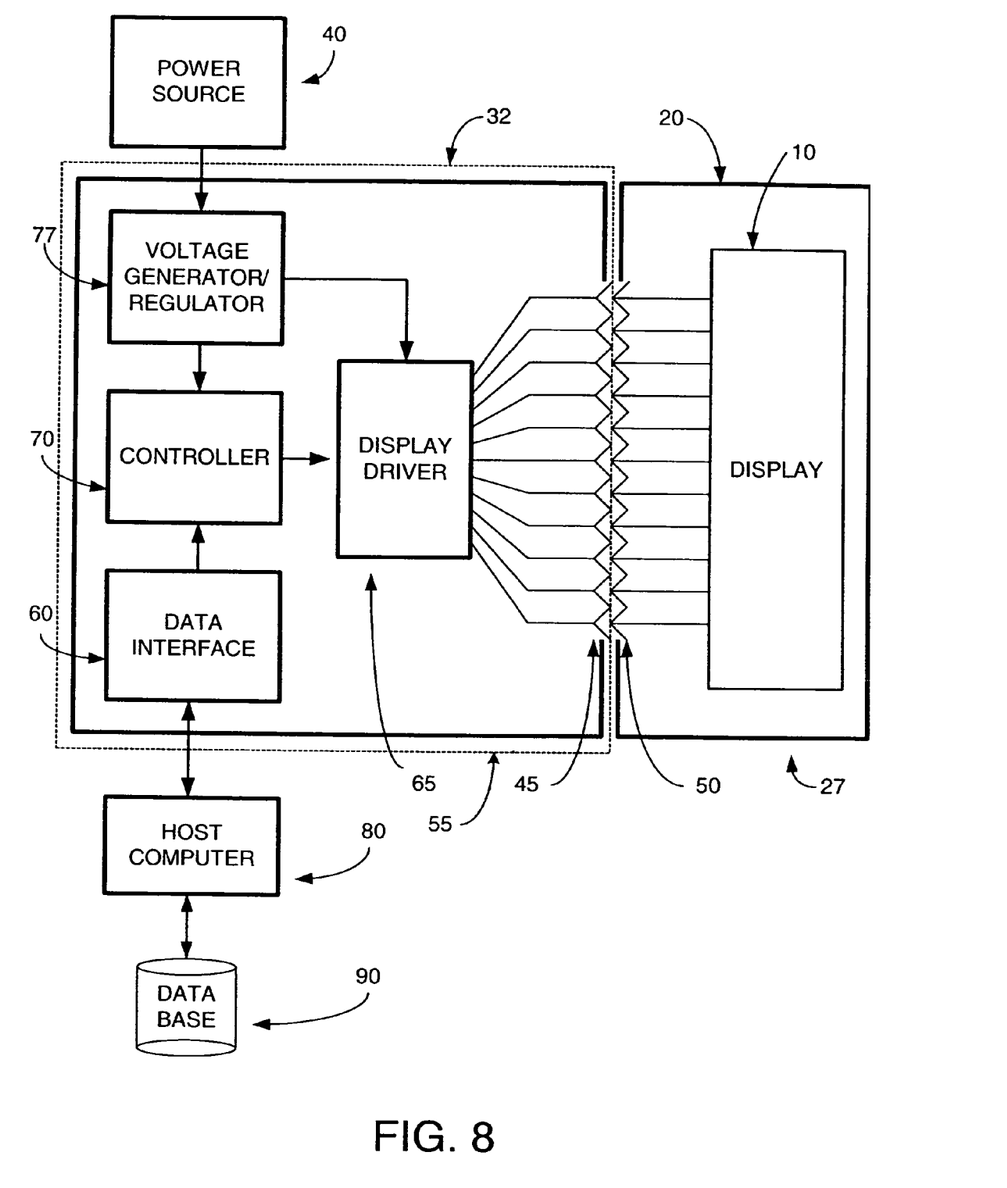
FIG. 8 is a schematic of a writing system where the display drivers are included in the display drive source, and the power source is external to the display drive source.

FIG. 8 is a block diagram of an electrical schematic for a signage system where the power source 40 is located external to the writing unit 35 including a display drive source 32. A database 90 can contain information about what the display element 10 should depict after being written. The database 90 can be accessed by a computer 80. The computer 80 can retrieve the necessary data from database 90 and provide appropriate signals to the display drive source 32 to cause a display change. Data from the computer 80 can be received by the display drive source 32 by means of a data interface 60. This data can be transferred between computer 80 and data interface 60 by wired means or wireless means. Data received by data interface 60 can be read by a controller 70, which can interpret the data and generate the necessary signal to the display driver 65. The display driver 65 can generate the necessary signal to change the contents of the display element 10. The signal generated by the display driver 65 can be transported to the display element 10 via one or more display drive source electrical contacts 45, which can be electrically connected to one or more electrical interconnect substrate electrical contact pad 50 or electrical interconnect substrate 20. The power source 40 can supply power for the voltage generator/regulator 77. The voltage generator/regulator 77 can generate the voltage necessary to run the display driver 65. The data interface 60, the display driver 65, the controller 70, and voltage generator/regulator 77 can all be located on circuit board 55.

Figure 9:
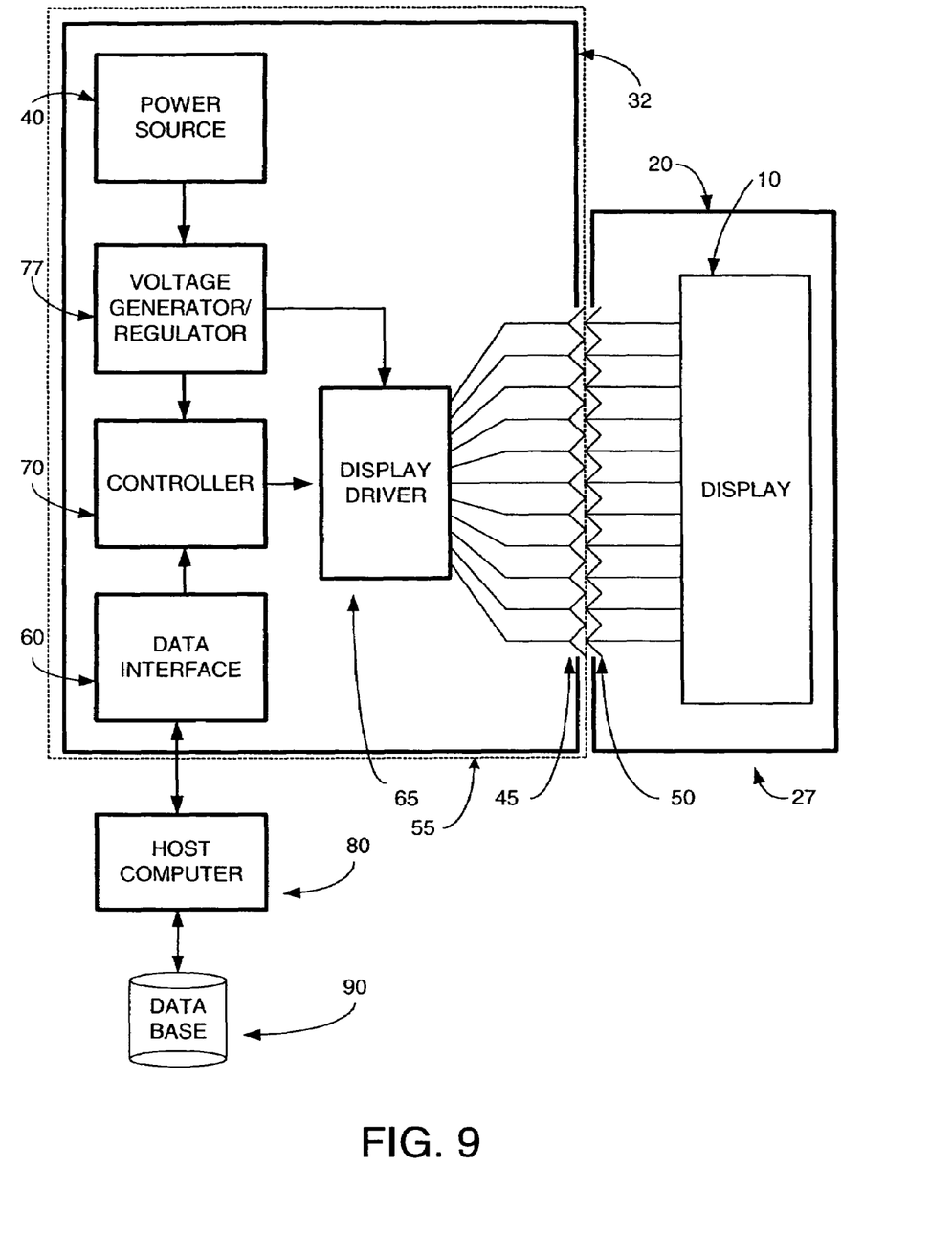
FIG. 9 is a schematic of a writing system where the power source is included in the display drive source.

FIG. 9 is a block diagram of another electrical schematic for a signage system, and is identical to FIG. 8 except that the power source 40 is part of the display drive source 32. The power source 40 can be a battery, an integrated solar cell, or any other suitable power source. As shown in FIG. 9, the power source 40 can be located on circuit board 55, or can be separate therefrom (see FIG. 10).

Figure 10:
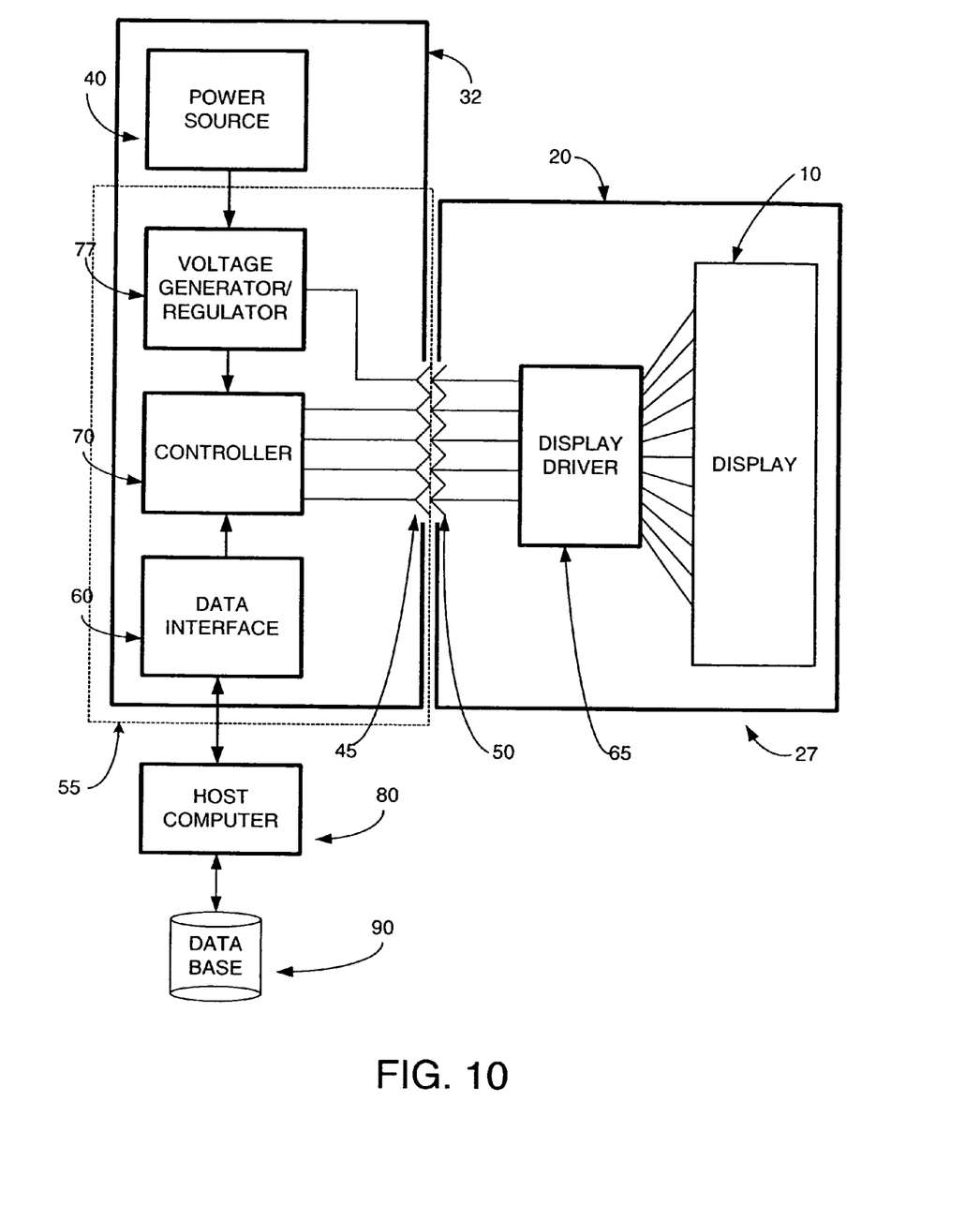
FIG. 10 is a schematic of a writing system where the display drive source is included in the display.

FIG. 10 is a block diagram of an electrical schematic for a signage system as described with respect to FIGS. 8 and 9, but wherein the display driver 65 can be integrated into the electrical interconnect substrate 20 of display 27. The inclusion of the display driver 65 in the electrical interconnect substrate 20 can reduce the number of connections between the display drive source 32 and the electrical interconnect substrate 20. For example, the number of display drive source electrical contacts 45 and electrical interconnect substrate electrical contacts 50 can be reduced. Display drivers utilize forms of data conversion, such as serial to parallel conversion. The electrical contacts between the display and the display drive source can be reduced from the total number of contacts in the electrical interconnect substrate 20 to the number of contacts required by the data conversion protocol.

As described herein, a signage system can include at least one display comprising at least one bi-stable display element, and at least one electrical interconnect substrate, wherein each display is electrically connected to at least one electrical interconnect substrate; at least one writing unit; and at least one holder. Each display can be written initially by a writing unit before being placed in a holder for display. A display can be left in a writing unit for display. For example, displays requiring frequent changes can be displayed in a writing unit. Other displays that do not require frequent changes can be displayed in a holder, and written by removing them from the holder and inserting them in a writing unit, or by placing the display in contact with the holder on a writing unit. Once written, the display can remain in the writing unit, or be removed to a holder for display.

The holder can support one or more displays. Each display can be written separately, or the holder with the displays can be moved to a writing unit for simultaneous writing of all displays in the holder. A writing unit also can support more than one display, and can be designed to write more than one display at a time.

The invention has been described in detail with particular reference to certain preferred embodiments thereof, but it will be understood that variations and modifications can be effected within the spirit and scope of the invention.

PARTS LIST 5 substrate
8 first conductive layer segments
9 liquid crystal layer
10 display element
12 alignment pin
15 display electrodes
20 electrical interconnect substrate
22 conductive adhesive
25 frame
27 display
26 slot
28 additional signage
30 holder
32 display drive source
35 writing unit
40 power source
45 display drive source electrical contacts
50 electrical interconnect substrate electrical contact pads
52 electrical interconnect substrate display contact pads
55 display drive source circuit board 60 data interface
65 display driver
70 controller
76 voltage generator/regulator
80 computer
90 database

The invention claimed is:

1. A display comprising:
a bi-stable display element comprising a bi-stable material layer, a first conductive layer, and a second conductive layer, wherein the first conductive layer and the second conductive layer are configured to change the state of the bi-stable material layer, wherein the first conductive layer includes first conductive layer segments accessible for electrical contact on a backside of the bi-stable display element, and the second conductive layer includes display electrodes accessible for electrical contact on the backside of the bi-stable display element; and
an electrical interconnect substrate comprising display contact pads located on a front side of the electrical interconnect substrate, the display contact pads being located so as to align and form a physical connection with the first conductive layer segments and the display electrodes of the bi-stable display element when the bi-stable display element overlays the electrical interconnect substrate, the display contact pads being physically connected, within the electrical interconnect substrate, to electrical interconnect substrate contact pads, the interconnect substrate contact pads being located such that when the bi-stable display element overlays the electrical interconnect substrate, the interconnect substrate contact pads are exposed to facilitate connecting to a writing unit, the interconnect substrate contact pads also being configured to receive signals to drive the conductive layers to change the state of the bi-stable material layer of the display element.

2. The display of claim 1, wherein the display element and the electrical interconnect substrate have a physical connection.

3. The display of claim 1, wherein the display contact pads of the electrical interconnect substrate connect with the first and second conductive layers of the display element through physical contact with a rear surface of the display element such that the display element overlays the display contact pads.

4. The display of claim 2, wherein the physical connection comprises a frame.

5. The display of claim 4, wherein the frame provides power for the display.

6. The display of claim 4, wherein the frame comprises a compression mechanism configured to maintain a physical connection between the bi-stable display element and the electrical interconnect substrate.

7. The display of claim 4, wherein the frame further comprises a signage-attachment mechanism.

8. The display of claim 7, wherein the signage is paper, plastic, cardboard, electronic, a liquid crystal display, a light emitting diode, an organic light emitting diode, a bistable display, a rewritable display, or a combination thereof.

9. The display of claim 1, comprising more than one electrical interconnect substrate.

10. The display of claim 1, comprising two bi-stable display elements connected to one electrical interconnect substrate.

11. The display of claim 1, comprising two or more electrical interconnect substrates and two or more display elements, wherein each display element is electrically connected to a separate one of the two or more electrical interconnect substrates.

12. The display of claim 1, wherein the electrical interconnect substrate comprises drive electronics.

13. The display of claim 2, wherein the interconnect substrate contacts and the display contact pads are disposed on a common surface of the electrical interconnect substrate.

14. The display of claim 1, further comprising a holder physically connected to the display.

15. The display of claim 14, wherein the display is removable from the holder.

16. The display of claim 14, wherein the holder is the writing unit.

17. A signage system comprising:
at least one display comprising:
a bi-stable display element, and
an electrical interconnect substrate,
wherein the bi-stable display element comprises a bi-stable material layer, a first conductive layer, and a second conductive layer, wherein the first conductive layer and the second conductive layer are configured to change the state of the bi-stable material layer, wherein the first conductive layer includes first conductive layer segments accessible for electrical contact on a backside of the bi-stable display element, and the second conductive layer includes display electrodes accessible for electrical contact on the backside of the bi-stable display element, and
wherein the electrical interconnect substrate comprises display contact pads located on a front side of the electrical interconnect substrate, the display contact pads being located so as to align and form a physical connection with the first conductive layer segments and the display electrodes of the bi-stable display element when the bi-stable display element overlays the electrical interconnect substrate, the display contact pads being physically connected, within the electrical interconnect substrate, to electrical interconnect substrate contact pads, the interconnect substrate contact pads located such that when the bi-stable display element overlays the electrical interconnect substrate, the interconnect substrate contact pads are exposed to facilitate connecting to a writing unit, the interconnect substrate contact pads also being configured to receive signals to drive the conductive layers to change the state of the bi-stable material layer of the display element;
at least one writing unit; and
at least one holder.

18. The display system of claim 17, wherein the writing unit comprises a power source.

19. The display system of claim 17, wherein the writing unit is connected to a power source.

20. The display system of claim 17, wherein the writing unit comprises a plurality of electrical contacts capable of electrically connecting with the electrical interconnect substrate.

21. The display system of claim 20, wherein the writing unit is electrically connected to the electrical interconnect substrate of the display through the holder.

22. The display system of claim 17, wherein the display is removable from the holder or writing unit.

23. The display system of claim 17, wherein the holder comprises a writing unit.

24. The display system of claim 17, wherein at least one writing unit is physically connected to at least one display.

25. The display system of claim 17, wherein the at least one writing unit is wirelessly addressable.

26. A method of writing a display in a signage system, the method comprising:

placing a display in electrical connection with a writing unit, wherein the display comprises at least one bi-stable display element and an electrical interconnect substrate, the at least one bi-stable display element comprising a bi-stable material layer, a first conductive layer, and a second conductive layer, wherein the first conductive layer and the second conductive layer are configured to change the state of the bi-stable material layer, wherein the first conductive layer includes first conductive layer segments accessible for electrical contact on a backside of the bi-stable display element, and the second conductive layer includes display electrodes accessible for electrical contact on the backside of the bi-stable display element, the electrical interconnect substrate comprising display contact pads located on a front side of the electrical interconnect substrate, the display contact pads being located so as to align and form a physical connection with the first conductive layer segments and the display electrodes of the bi-stable display element when the bi-stable display element overlays the electrical interconnect substrate, the display contact pads being physically connected, within the electrical interconnect substrate, to electrical interconnect substrate contact pads, the interconnect substrate contact pads being located such that when the bi-stable display element overlays the electrical interconnect substrate, the interconnect substrate contact pads are exposed to facilitate connecting to the writing unit, the interconnect substrate contact pads also being configured to receive signals to drive the conductive layers to change the state of the bi-stable material layer of the display element; and writing the display with the writing unit.

27. The method of claim 26, wherein the signage system comprises two or more displays, and the displays are written sequentially.

28. The method of claim 26, wherein the signage system comprises two or more displays, and the displays are written simultaneously.

29. A method of writing a display in a signage system, the method comprising:

removing at least one of two or more displays of a signage system from a holder, wherein each display comprises at least one bi-stable display element and an electrical interconnect substrate, the at least one bi-stable display element comprising a bi-stable material layer, a first conductive layer, and a second conductive layer, and wherein the first conductive layer and the second conductive layer are configured to change the state of the bi-stable material layers wherein the first conductive layer includes first conductive layer segments accessible for electrical contact on a backside of the bi-stable display element, and the second conductive layer includes display electrodes accessible for electrical contact on the backside of the bi-stable display element, the electrical interconnect substrate comprising display contact pads located on a front side of the electrical interconnect substrate, the display contact pads being located so as to align and form a physical connection with the first conductive layer segments and the display electrodes of the bi-stable display element when the bi-stable display element overlays the electrical interconnect substrate, the display contact pads being physically connected, within the electrical interconnect substrate, to electrical interconnect substrate contact pads, the interconnect substrate contact pads being located such that when the bi-stable display element overlays the electrical interconnect substrate, the interconnect substrate contact pads are exposed to facilitate connecting to a writing unit, the interconnect substrate contact pads also being configured to receive signals to drive the conductive layers to change the state of the bi-stable material layer of the display element;

placing the removed display in electrical contact with the writing unit; and writing the display with the writing unit.

30. The method of claim 29, wherein each of the two or more displays are written sequentially.

31. The method of claim 29, wherein the two or more displays are written simultaneously.

32. A method of writing a display in a signage system, the method comprising:

placing a display in a holder in electrical contact with a writing unit, wherein the display comprises at least one bi-stable display element and an electrical interconnect substrate, the at least one bi-stable display element comprising a bi-stable material layer, a first conductive layer, and a second conductive layer, and wherein the first conductive layer and the second conductive layer are configured to change the state of the bi-stable material layer, wherein the first conductive layer includes first conductive layer segments accessible for electrical contact on a backside of the bi-stable display element, and the second conductive layer includes display electrodes accessible for electrical contact on the backside of the bi-stable display element, the electrical interconnect substrate comprising display contact pads located on a front side of the electrical interconnect substrate, the display contact pads being located so as to align and form a physical connection with the first conductive layer segments and the display electrodes of the bi-stable display element when the bi-stable display element overlays the electrical interconnect substrate, the display contact pads being physically connected, within the electrical interconnect substrate, to electrical interconnect substrate contact pads, the interconnect substrate contact pads being located such that when the bi-stable display element overlays the electrical interconnect substrate, the interconnect substrate contact pads are exposed to facilitate connecting to a writing unit, the interconnect substrate contact pads also being configured to receive signals to drive the conductive layers to change the state of the bi-stable material layer of the display element; and writing the display.

33. The method of claim 32, wherein the signage system comprises two or more displays, and the displays are written simultaneously.

* * * * *

UNITED STATES PATENT AND TRADEMARK OFFICE
CERTIFICATE OF CORRECTION

| | | |
|---|---|---|
| PATENT NO. | : 7,683,855 B2 | |
| APPLICATION NO. | : 10/851907 | |
| DATED | : March 23, 2010 | |
| INVENTOR(S) | : Capurso et al. | |

It is certified that error appears in the above-identified patent and that said Letters Patent is hereby corrected as shown below:

Column 11,
Line 53, "layers wherein" should read --layer, wherein--.

Signed and Sealed this
Eighth Day of March, 2011

David J. Kappos
*Director of the United States Patent and Trademark Office*